US012154741B2

(12) United States Patent
Waleck et al.

(10) Patent No.: US 12,154,741 B2
(45) Date of Patent: Nov. 26, 2024

(54) ASSEMBLY FOR ENGAGING AN ELECTROMAGNETIC ACTUATOR

(71) Applicant: ABB Schweiz AG, Baden (CH)

(72) Inventors: Ian Christopher Waleck, Milford, PA (US); Ryan Scott Huttman, Milford, PA (US)

(73) Assignee: ABB Schweiz AG, Baden (CH)

( * ) Notice: Subject to any disclaimer, the term of this patent is extended or adjusted under 35 U.S.C. 154(b) by 296 days.

(21) Appl. No.: 17/684,510

(22) Filed: Mar. 2, 2022

(65) Prior Publication Data

US 2023/0282433 A1 Sep. 7, 2023

(51) Int. Cl.

*H01H 50/18* (2006.01)
*H01H 50/02* (2006.01)
*H01H 50/64* (2006.01)

(52) U.S. Cl.

CPC ............ *H01H 50/18* (2013.01); *H01H 50/02* (2013.01); *H01H 50/641* (2013.01)

(58) Field of Classification Search

CPC ....... H01H 50/18; H01H 50/02; H01H 50/641
See application file for complete search history.

(56) References Cited

U.S. PATENT DOCUMENTS

2010/0170874 A1* 7/2010 Tsuchiya ............ H01H 33/6661 218/118
2011/0062117 A1* 3/2011 Tsuchiya ............ H01H 33/6661 218/139
2016/0141117 A1* 5/2016 Ashtekar .................. H02H 3/04 324/424
2022/0238288 A1* 7/2022 Dauksas .......... H01H 33/66207

FOREIGN PATENT DOCUMENTS

WO 2020219905 A1 10/2020

* cited by examiner

*Primary Examiner* — Bernard Rojas
(74) *Attorney, Agent, or Firm* — McCarter & English, LLP

(57) ABSTRACT

An assembly for engaging an electromagnetic actuator comprising a first shaft having a first link and a second shaft having a second link connected by a biasing assembly configured to rotate between an initial and a final position. A contact arm of the second shaft advances a sliding armature of the electromagnetic actuator from an activated state to a deactivated state such that the assembly prevents the electromagnetic actuator from returning to the activated state. The biasing assembly has a toggle-over position in which a biasing force rotates the contact arm from the toggle-over position to the final position.

26 Claims, 11 Drawing Sheets

ASSEMBLY FOR ENGAGING AN ELECTROMAGNETIC ACTUATOR

FIELD OF THE DISCLOSURE

The present disclosure relates generally to systems and methods for dis-engaging a magnetic actuator, and more particularly to a lock-out mechanism for an interrupter for switching medium-voltage to high-voltage circuits.

BACKGROUND

Molded vacuum interrupters ("MVI") in electrical distribution applications, such as medium and high-voltage switchgear and substations, utilize circuit breakers having electrically conductive contacts enclosed in a vacuum enclosure. Relative to air-brake circuit breakers, electrical contacts located in a vacuum require less travel distance to open an associated circuit, as well as less force to open and reset the breakers.

MVI's commonly use spring mechanisms or electromagnetic actuators to separate the conductive contacts of the vacuum circuit breaker and open the circuit of the MVI. The associated MVI electromagnetic actuators have a fixed permanent magnet that is in contact with a plunger when the electromagnetic actuator is in an activated state. The plunger is connected to a sliding armature which can be advanced to mechanically separate the plunger from the fixed permanent magnet, placing the electromagnetic actuator in a deactivated state. The electromagnetic actuator can be activated or deactivated by energizing a coil of the electromagnetic actuator. The sliding armature of the electromagnetic actuator is mechanically coupled to a push rod of the vacuum circuit breaker which separates the conductive contacts of the vacuum circuit breaker when the sliding armature is advanced, placing the electromagnetic actuator in the deactivated state.

Electromagnetic actuators can be connected to an electrical control system which energizes a coil surrounding the plunger. Energizing the coil by sending an electrical signal to the electromagnetic actuator places the electromagnetic actuator in the activated state which causes the plunger to magnetically contact the fixed permanent magnet. Advancement of the plunger against the fixed permanent magnet causes the conductive contacts of the vacuum circuit breaker to contact each other and close the circuit of the MVI. Thus, placing the electromagnetic actuator in the deactivated state opens the MVI by separating the conductive contacts of the circuit breaker, and placing the electromagnetic actuator in the activated state closes the MVI.

Servicepersons who perform maintenance on the switchgear or substation using the MVI are required to open the MVI circuit prior to performing maintenance. This process is commonly known as lock-out, where servicepersons can ensure that an open MVI remains open while maintenance is performed on the system. However, in the event of an accidental activation of the electromagnetic actuator or failure within the control system more generally, the electromagnetic actuator can unintentionally close the MVI circuit. Such instances can be dangerous as servicepersons may unknowingly be servicing a live or "hot" system.

Thus, there is a need in the art to provide a mechanical lock-out mechanism in electrical distribution applications which can be manually operated and lock the electromagnetic actuator in the deactivated state such that the electromagnetic actuator does not close the MVI circuit during the lock-out maintenance.

SUMMARY

In one aspect, an assembly for engaging an electromagnetic actuator is disclosed. The assembly includes a first shaft having a first end connected to an input crank and a first link located along the first shaft, the first shaft and first link rotatable about a first axis in a first angular direction. The assembly further includes a second shaft having a second link located along the second shaft, and a contact arm located along the second shaft, the second link and contact arm rotatable about a second axis in the first angular direction, the contact arm configured to advance a sliding armature of the electromagnetic actuator, and a biasing assembly having a movable first member connected to the first link, a movable second member connected to the second link, and a biasing member disposed between the first pin and the second pin, the biasing assembly rotatable about a biasing assembly axis in a second angular direction between an initial position and a final position. Rotation of the first link in the first angular direction between the initial position and a toggle-over position causes the biasing member to rotate in the second angular direction, and the first pin and the second pin to compress the biasing member, and rotation of the first link in the first angular direction between the toggle-over position and final position causes the biasing member to urge the first pin and the second pin away from the biasing member.

In another aspect, a lock-out mechanism for an interrupter is disclosed. The lock-out mechanism includes at least one vacuum circuit breaker assembly comprising a fixed conductive contact and a movable conductive contact, the movable conductive contact connected to a push rod, the push rod configured to separate the fixed conductive contact from the movable conductive contact upon movement of the push rod away from the fixed conductive contact. The lock-out mechanism further includes at least one electromagnetic actuator assembly comprising a fixed permanent magnet, a plunger and a sliding armature having a first end and a second end, the first end connected to the push rod of the at least one vacuum circuit breaker assembly and the second end connected to the plunger, the at least one electromagnetic actuator having an activated state and a deactivated state. The activated state is defined by the plunger contacting the fixed permanent magnet and the deactivated state defined by the plunger separated from the fixed permanent magnet, the at least one electromagnetic actuator configured to conductively separate the movable conductive contact from the fixed conductive contact.

The lock-out mechanism also includes an assembly having a first shaft having a first end connected to an input crank and a first link located along the first shaft, the first shaft and first link rotatable about a first axis in a first angular direction; a second shaft having a second link located along the second shaft, and a contact arm located along the second shaft, the second link and contact arm rotatable about a second axis in the first angular direction, the contact arm configured to advance the sliding armature of the at least one electromagnetic actuator assembly; and, a biasing assembly having a movable first member connected to the first link, a movable second member connected to the second link, and a biasing member disposed between the first pin and the second pin, the biasing assembly rotatable about a biasing assembly axis in a second angular direction between an initial position and a final position. Rotation of the first link in the first angular direction between the initial position and a toggle-over position causes the biasing member to rotate in the second angular direction, and the first pin and the second pin to compress the biasing member. Rotation of the first link in the first angular direction between the toggle-over position and final position causes the biasing member to urge the first pin and the second pin away from the biasing member.

In yet another aspect, method for locking-out an interrupter is disclosed. The method includes the steps of rotating an input crank of a mechanical assembly in a first angular direction such that a contact arm of the mechanical assembly is rotated from an initial position to a toggle-over position and rotating the input crank in the first angular direction such that the contact arm of the mechanical assembly is rotated from the toggle-over position to a final position. The mechanical assembly includes a first shaft having a first end connected to an input crank and a first link located along the first shaft, the first shaft and first link rotatable about a first axis in the first angular direction; a second shaft having a second link located along the second shaft, and the contact arm located along the second shaft, the second link and contact arm rotatable about a second axis in the first angular direction, the contact arm configured to advance a sliding armature of at least one electromagnetic actuator assembly; and, a biasing assembly having a movable first member connected to the first link, a movable second member connected to the second link, and a biasing member disposed between the first pin and the second pin, the biasing assembly rotatable about a biasing assembly axis in a second angular direction between an initial position and a final position. The electromagnetic actuator assembly comprises a fixed permanent magnet, a plunger and a sliding armature having a first end and a second end, the first end connected to a push rod of at least one vacuum circuit breaker assembly and the second end connected to the plunger, the at least one electromagnetic actuator having an activated state and a deactivated state. The activated state is defined by the plunger contacting the fixed permanent magnet and the deactivated state defined by the plunger separated from the fixed permanent magnet, the at least one electromagnetic actuator configured to conductively separate the movable conductive contact from the fixed conductive contact.

BRIEF DESCRIPTION OF THE DRAWINGS

The subject-matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE DRAWINGS

In the following specification and the claims, reference will be made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

As used herein, the term "closed" refers to an electrical circuit, a system, a component, feature, or element of the present disclosure in which electricity passes through and flows uninterrupted. As used herein, the term "open" describes an electrical circuit, a system, a component, feature, or element of the present disclosure in which continuity is broken such that current is interrupted and does not flow.

Embodiments of the present disclosure are directed to a mechanical assembly 200 for engaging an electromagnetic actuator of a molded vacuum interrupter, more generally an interrupter or a circuit breaker with an actuator mechanism, to provide a lock-out mechanism to close the circuit of the molded vacuum interrupter. The mechanical assembly 200 is configured to advance a sliding armature of the electromagnetic actuator from an initial position to a final position such that the electromagnetic actuator is placed in a deactivated state. The mechanical assembly 200 is further configured to lock the electromagnetic actuator in the deactivated state such that energizing the electromagnetic actuator does not close the MVI circuit during the lock-out maintenance.

Figure 1:
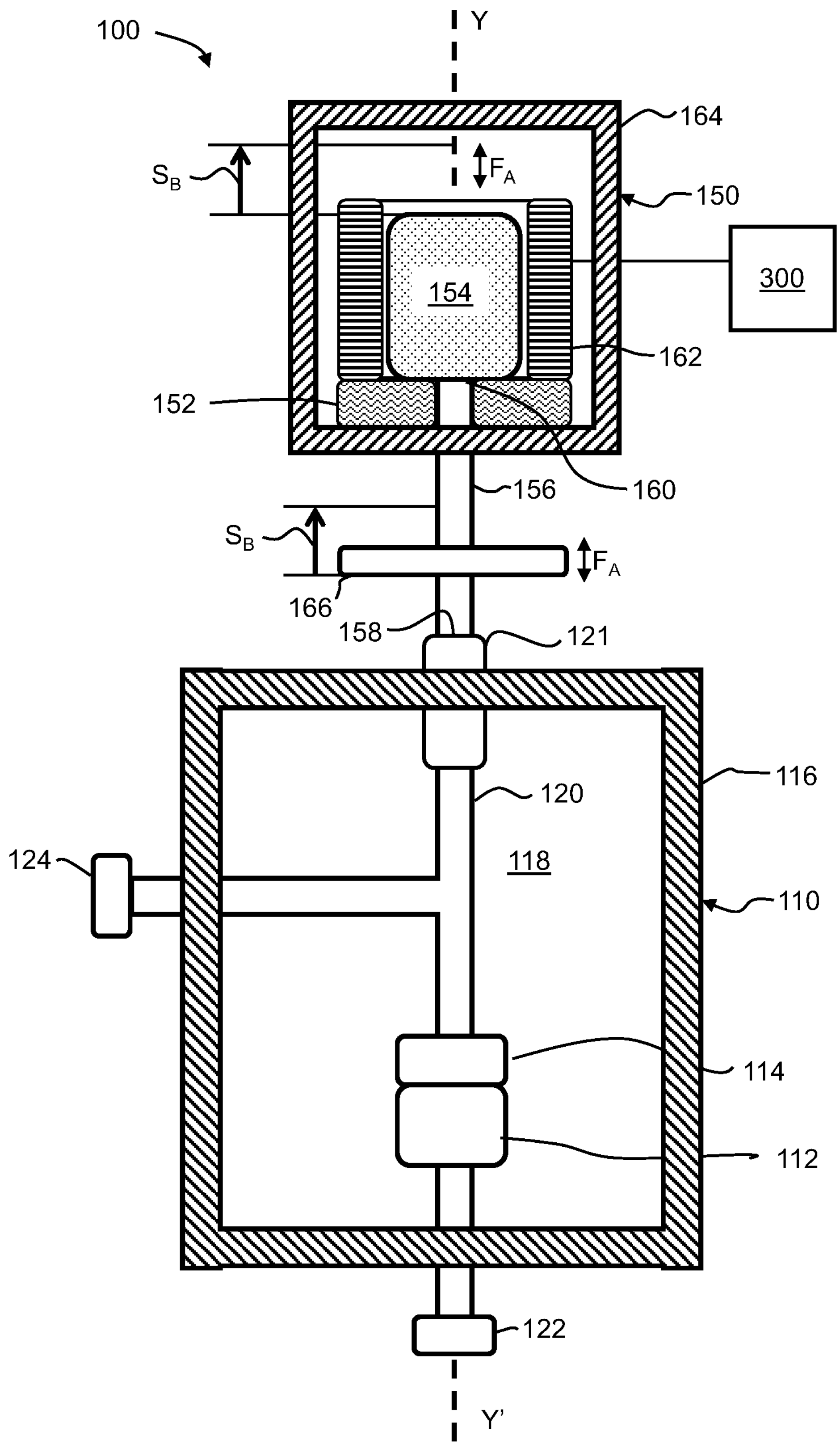
FIG. 1 is a schematic representation of a molded vacuum interrupter according to an embodiment of the disclosure.

FIG. 1 illustrates a schematic representation of a molded vacuum interrupter 100 having a vacuum circuit breaker 110 and an electromagnetic actuator 150. The vacuum circuit breaker 110 comprises a fixed conductive contact 112 and a movable conductive contact 114 enclosed within a vacuum enclosure 116. The vacuum enclosure 116 is insulated by one or more layers of ceramic insulators and is sealed from atmosphere creating a vacuum medium 118. The vacuum medium 118 is configured to quench arcing between the fixed conductive contact 112 and a movable conductive contact 114 during opening and closing of the molded vacuum interrupter 100 circuit and translation of the movable conductive contact 114 relative to the fixed conductive contact 112.

The vacuum circuit breaker 110 further comprises a push rod 120 coupled to the movable conductive contact 114 and is configured to advance the movable conductive contact 114 between an open position and a closed position relative to the fixed conductive contact 112 such that the vacuum circuit breaker 110 is opened or closed respectively. As illustrated in FIG. 1, the movable conductive contact 114 is shown contacting the fixed conductive contact 112 in FIG. 1 in the closed position and the movable conductive contact 114 is reversibly separated from the fixed conductive contact 112 The fixed conductive contact 112 is conductively connected to a first terminal 122 and the movable conductive contact 114 is conductively connected to a second terminal 124. The first terminal 122 and second terminal 124 extend outward from the enclosure 116 and are configured to connect the vacuum circuit breaker 110 to positive or negative terminals of a substation or more generally a system the molded vacuum interrupter 100 is connected to. In some embodiments, the first terminal 122 and second terminal 124 are positioned outside of the vacuum enclosure 116. In some embodiments, an elastic or movable bridge (not shown) conductively connects the second terminal 124 to the push rod 120 such that the second terminal 124 remains fixed while the push rod 120 and the movable conductive contact 114 translate or advance between the open position and closed position.

In some embodiments, the vacuum circuit breaker 100 and electromagnetic actuator 150 are positioned adjacent to one another about a central axis Y-Y'. In some embodiments, the push rod 120 further comprises an overtravel spring 121 which extends from the vacuum enclosure 116 along the central axis Y-Y' and is mechanically coupled to a sliding armature 156 of the electromagnetic actuator 150. The sliding armature 156 is configured to translate by a stroke distance $S_B$ to compress or release an overtravel spring 121. As explained in further detail below, the overtravel spring 121 stores potential spring energy which is configured to separate or push the movable conductive contact 114 against the fixed conductive contact 112 as the sliding armature 156 of the electromagnetic actuator 150 is moved between an initial and final position.

The electromagnetic actuator 150 comprises a fixed permanent magnet 152, a plunger 154, an actuator opening spring (not shown) and the sliding armature 156 having a first end 158 and a second end 160. The first end 158 of the sliding armature 156 is coupled to the overtravel spring 121 of the push rod 120 of the vacuum circuit breaker 110 and the second end 160 is coupled to the plunger 154. The plunger 154 has a substantially cylindrical shape and is made of a magnetic material such as a metal. A coil winding or more generally an electromagnetic coil 162 surrounds the plunger 154. The electromagnetic coil 162 is conductively connected to a control system 300 and the control system 300 is configured to send a control signal which is configured to energize or deenergize the electromagnetic coil 162. In some embodiments, the control system 300 is configured to reverse polarity of the electromagnetic coil 162 when changing the state of the electromagnetic actuator 150.

The fixed permanent magnet 152, plunger 154, sliding armature 156 and electromagnetic coil 162 are enclosed within a housing 164. The first end (not shown) of the sliding armature 156 extends out from the housing 164. In some embodiments, the housing 164 of the electromagnetic actuator 150 is insulated such that signal interference or electromagnetic interference cannot cause inadvertent energizing or deenergizing of the electromagnetic coil 162. In some embodiments, a pad or barrier (not shown) is positioned between one or more of the fixed permanent magnet 152, plunger 154, sliding armature 156 and electromagnetic coil 162 to prevent direct contact of components.

The electromagnetic actuator 150 is in an activated state defined by the plunger 154 contacting the fixed permanent magnet 152, and the electromagnetic actuator 150 is in a deactivated state defined by the plunger 154 separated from the fixed permanent magnet 152. Reversing polarity of the electromagnetic coil 162 causes the plunger 154 to advance against and contact the fixed permanent magnet 152, and subsequently reversing polarity of the electromagnetic coil 162 causes the plunger 154 to separate from the fixed permanent magnet 152. Thus, reversing polarity of the electromagnetic coil 162 places the electromagnetic actuator 150 in the activated state and subsequently reversing polarity of the electromagnetic coil 162 places the electromagnetic actuator 150 in the deactivated state. Reversing polarity of the electromagnetic coil 162 applies an actuator force FA to the plunger 154 causing displacement of the plunger 154 toward or away from the fixed permanent magnet 152 by the stroke distance $S_B$. The actuator opening spring stores potential spring energy which is configured to separate or push the plunger 154 from the fixed permanent magnet 152 as the sliding armature 156 is moved between an initial and final position.

The actuator opening springs and the overtravel spring 121 exert biasing forces in the same direction as the sliding armature 156 is moved between an initial and final position. As the sliding armature 156 and the plunger 154 are advanced away from the fixed permanent magnet 152 by a trip distance, potential energy from both the actuator opening spring and the overtravel spring 121 is released. Advancement beyond the trip distance to an overtravel distance Do (as shown in FIG. 7B), causes the plunger 154 to advance away from the fixed permanent magnet 152, and advancement beyond the overtravel distance Do causes the movable conductive contact 114 of the vacuum circuit breaker 110 to separate from the fixed conductive contact 112, opening the circuit breaker 110. In some embodiments, advancement from beyond the overtravel distance Do to the stroke distance $S_B$ causes the movable conductive contact 114 of the vacuum circuit breaker 110 to separate from the fixed conductive contact 112, opening the circuit breaker 110.

Potential spring energy stored within the actuator opening spring is sufficient to reversibly separate the movable conductive contact 114 of the vacuum circuit breaker 110 from the fixed conductive contact 112 when the electromagnetic actuator 150 is placed in the deactivated state and the sliding armature 156 and the plunger 154 have traveled beyond the overtravel distance Do. The overtravel spring 121 is also configured to maintain the movable conductive contact 114 against the fixed conductive contact 112 when the electromagnetic actuator 150 is placed in the activated state. Advancement of the plunger 154 away from the fixed permanent magnet 152 by the overtravel distance Do (as shown in FIG. 7B) will cause the release of the potential spring energy stored within the actuator opening springs, causing the movable conductive contact 114 of the vacuum circuit breaker 110 to separate from the fixed conductive contact 112. Thus, when the actuator force FA is applied to the plunger 154 and the plunger 154 had been displaced by at least the overtravel distance Do, the potential spring energy of the actuator opening spring is released. In some embodiments, the overtravel distance Do is less than the stroke distance $S_B$.

The electromagnetic actuator 150 can also be mechanically placed in the deactivated state by mechanically advancing the sliding armature 156 into the electromagnetic actuator 150 such that the plunger 154 is separated or pulled away from the fixed permanent magnet 152. By way of example, a flange 166 or more generally a mechanical coupling can be affixed to the sliding armature 156 externally from the housing 164 of the electromagnetic actuator 150. The flange 166 and sliding armature 156 can be advanced by a mechanical force $F_M$ applied to the flange 166 or sliding armature 156 such that the plunger 154 is forcibly separated from the fixed permanent magnet 152. In some embodiments, the mechanical force $F_M$ is greater than the actuator force FA such that the plunger 154 is forcibly separated from the fixed permanent magnet 152 even when the electromagnetic coil 162 is applying the actuator force FA in a force direction opposite the force direction of the mechanical force $F_M$. In some embodiments, as long as the mechanical force $F_M$ is applied to the sliding armature 156 or flange 166, the electromagnetic actuator 150 cannot return to the activated state and the movable conductive contact 114 cannot be advanced to contact the fixed conductive contact 112 of the vacuum circuit breaker 110. Thus, application of the mechanical force $F_M$ to the sliding armature 156 or flange 166 effectively locks-out the molded vacuum interrupter 100. As explained in further detail below, the mechanical assembly 200 is configured to mechanically advance the sliding armature 156 and apply the mechanical force $F_M$ to the sliding armature 156 or flange 166. The mechanical assembly 200 removably holds the electromagnetic actuator 150 in the deactivated state such that the electromagnetic actuator 150 cannot close the vacuum circuit breaker 110, effectively locking-out the molded vacuum interrupter 100. The mechanical assembly 200 advances the sliding armature 156 or flange 166 by the overtravel distance Do and the stroke distance $S_B$ such that the potential spring energy of the overtravel spring 121 and the actuator opening spring are released and the actuator 150 is placed in the deactivated state.

Figure 2:
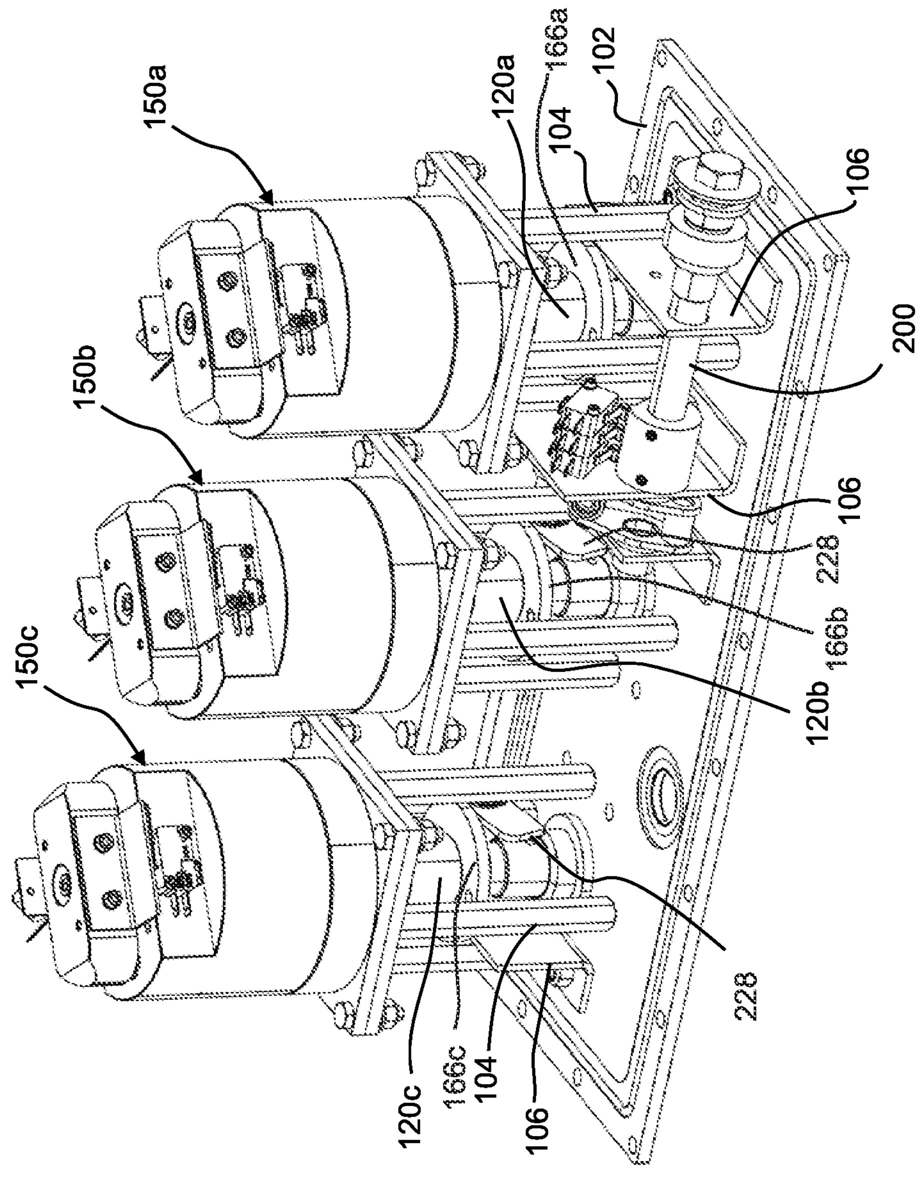
FIG. 2 is a perspective view of a mechanical assembly for engaging an electromagnetic actuator according to an embodiment of the disclosure.

FIG. 2 illustrates a perspective view of a mechanical assembly 200 for engaging the electromagnetic actuator 150 according to an embodiment of the disclosure. As shown, three electromagnetic actuators (150*a*, 150*b*, 150*c*) are positioned above a base plate 102. The three electromagnetic actuators (150*a*, 150*b*, 150*c*) each comprise a respective sliding armature (156*a*, 156*b*, 156*c*) extending through the base plate 102 and are coupled with three respective push rods (not shown) of three vacuum circuit breakers (not shown). The three electromagnetic actuators (150*a*, 150*b*, 150*c*) and three vacuum circuit breakers (not shown) define a 3-pole system. In some embodiments, a 1-pole system has a single electromagnetic actuator 150 and a single vacuum circuit breaker 110. In some embodiments, the system has at least one electromagnetic actuator 150 and at least one vacuum circuit breaker 110. The structure and functionality of armatures 150*a*, 150*b* and 150*c* is the same so as the description proceeds the structure and functionality of armature 150, representing the structure and functionality of all armatures will be described. The at least one electromagnetic actuator 150 is separated from the base plate 102 by spacers 104 connecting the least one electromagnetic actuator 150 to the base plate 102. The mechanical assembly 200 is positioned between the base plate 102 and the least one electromagnetic actuator 150, and in some embodiments the mechanical assembly 200 is supported by brackets 106 mounted on the base plate 102. As illustrated, the mechanical assembly 200 extends under the three electromagnetic actuators (150*a*, 150*b*, 150*c*), and under each of the three electromagnetic actuators (150*a*, 150*b*, 150*c*) a contact arm 228 is positioned under respective flanges (166*a*, 166*b*, 166*c*). Thus, the 3-pole system comprises a single mechanical assembly 200 which is configured to mechanically advance the sliding armature (156*a*, 156*b*, 156*c*) of each of the three electromagnetic actuators (150*a*, 150*b*, 150*c*) and apply the mechanical force $F_M$ to the respective flanges (166*a*, 166*b*, 166*c*) concurrently. Stated differently, the contact arms 228 of a single mechanical assembly 200 mechanically advances the sliding armatures (156*a*, 156*b*, 156*c*) simultaneously.

Figure 3:
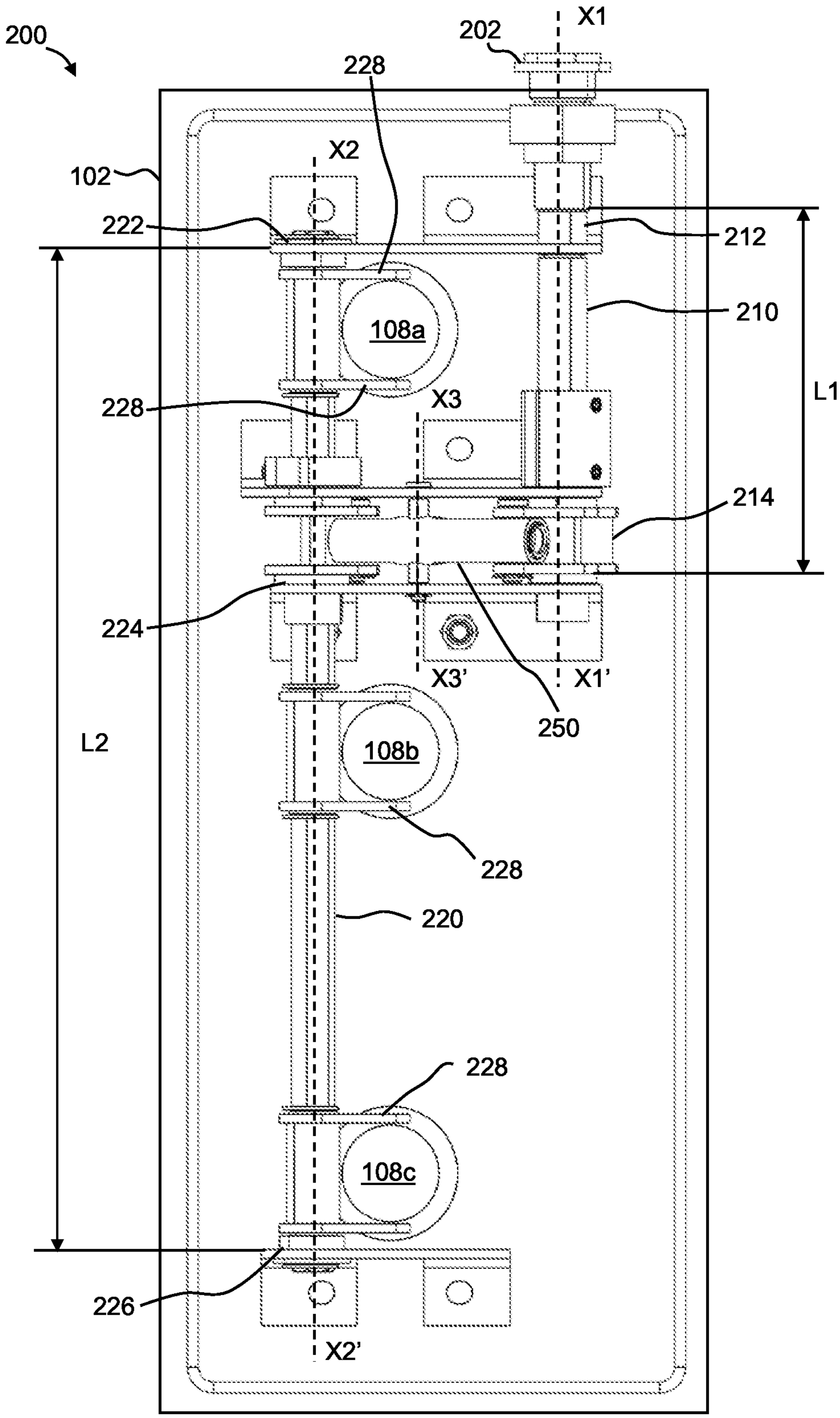
FIG. 3 is a top view of the mechanical assembly of FIG. 2

FIG. 3 illustrates a top view of the mechanical assembly 200 and base plate 102 in a 3-pole configuration. The base plate 102 in the 3-pole configuration comprises apertures (108*a*, 108*b*, 108*c*) extending through the base plate 102. The apertures (108*a*, 108*b*, 108*c*) receive the sliding armatures (156*a*, 156*b*, 156*c*) of FIG. 2.

The mechanical assembly 200 comprises a first shaft 210 and a second shaft 220 connected by a biasing assembly 250. The first shaft 210 has a first end 212 connected to an input crank 202 and a first link 214 located along a length L1 of the first shaft 210. The second shaft 220 has a second link 224 located along a length L2 of the second shaft and a contact arm 228 located along the length L2. In some embodiments, the second shaft 220 and the length L2 are configured to accommodate multiple contact arms 228 as shown in FIG. 2. As shown in the 3-pole configuration of FIG. 3, the second shaft 220 extends from a first end 222 to a second end 226 such that the apertures (108*a*, 108*b*, 108*c*) are between the first end 222 and second end 226. In some embodiments, the input crank 202 can be manually rotated by a user or attached to a motor. In some embodiments, the input crank 202 is a manually operated handle.

Figure 4:
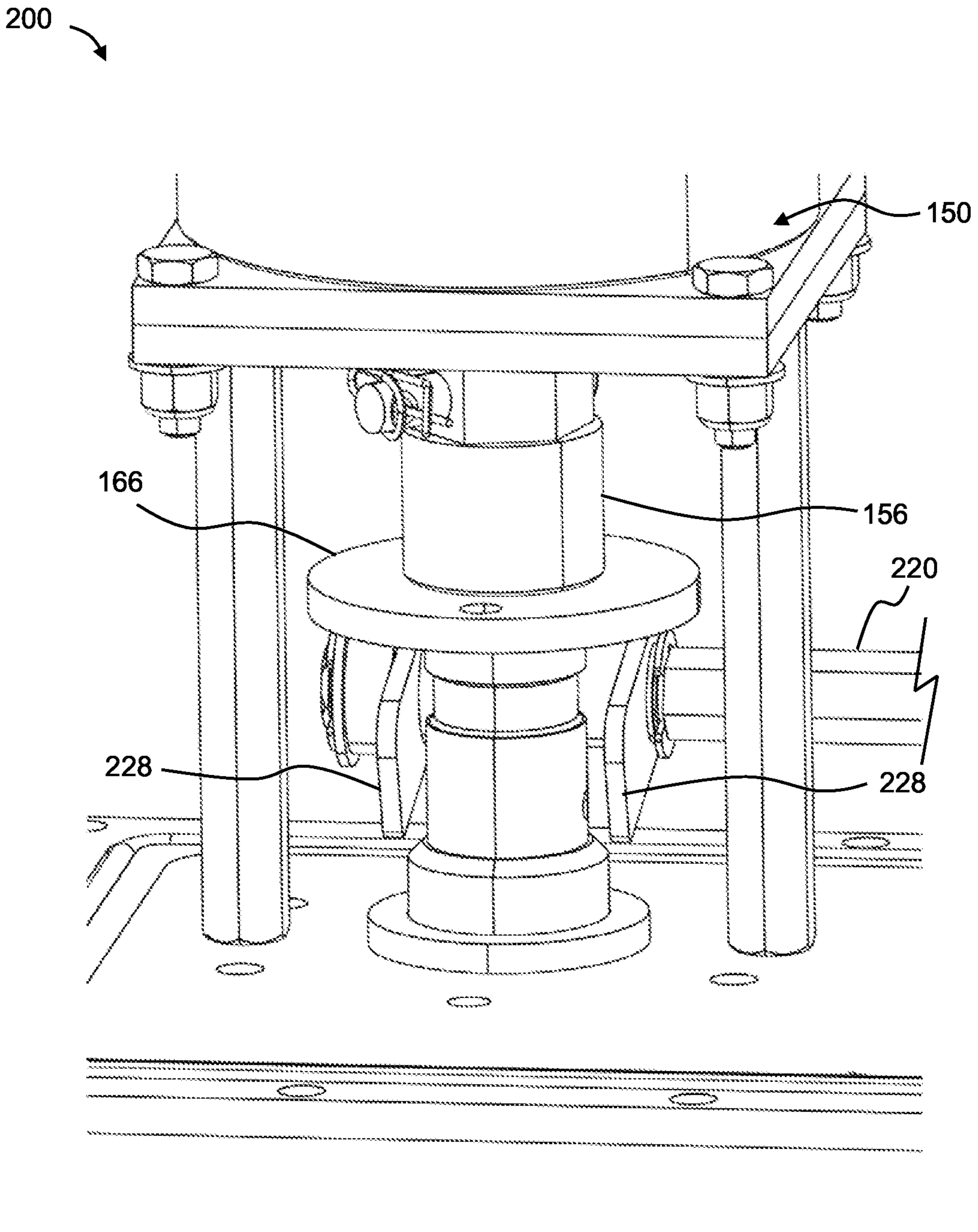
FIG. 4 is a perspective view of the mechanical assembly of FIG. 2 in an initial position.

As best shown in FIGS. 3 and 4, in some embodiments, two contact arms 228 are positioned between each of the sliding armatures (156*a*, 156*b*, 156*c*) and over each of the apertures (108*a*, 108*b*, 108*c*). In some embodiments, each of the apertures (108*a*, 108*b*, 108*c*) have a single contact arm 228 positioned between each of the sliding armatures (156*a*, 156*b*, 156*c*). As explained in further detail below, upon rotation of the second shaft 220 and the two contact arms 228, each of the two contact arms 228 are configured to advance the sliding armatures (156*a*, 156*b*, 156*c*). In some embodiments, a single contact arm 228 is configured to advance each of the sliding armatures (156*a*, 156*b*, 156*c*). In some embodiments, at least one contact arm 228 is configured to advance the flange 166 of the sliding armature 156.

Figure 5A:
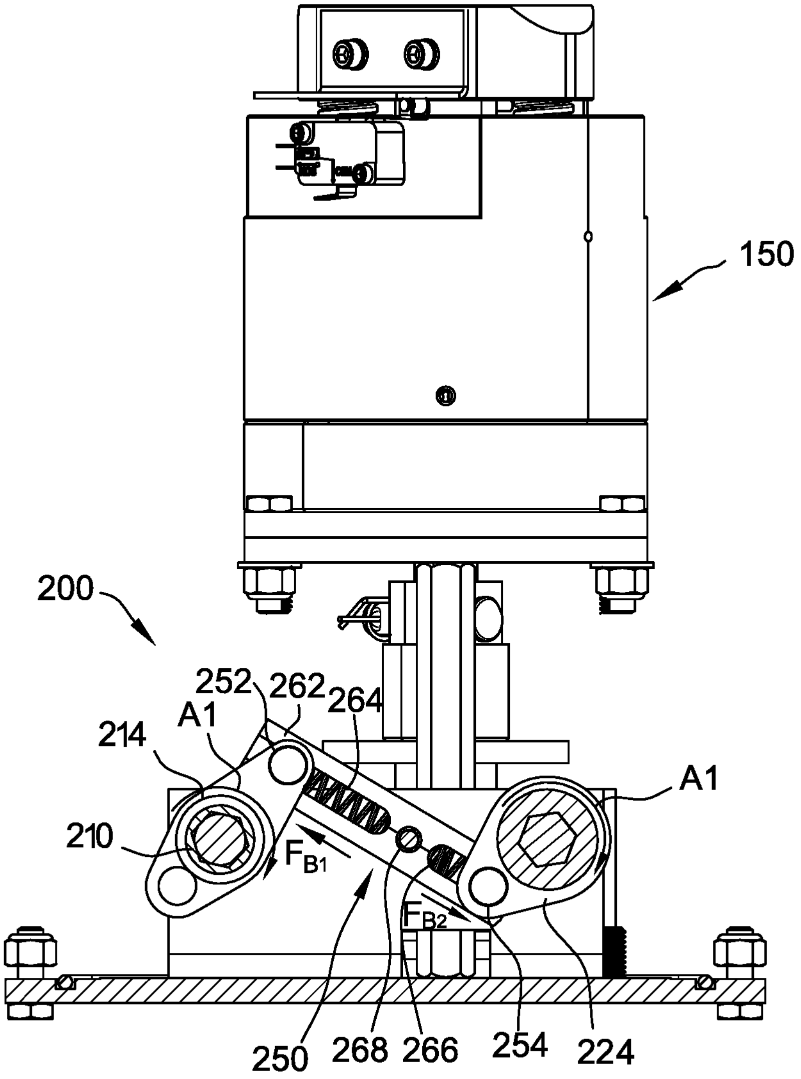
FIG. 5A is a side view of the mechanical assembly of FIG. 2 in an initial position.
Figure 5B:
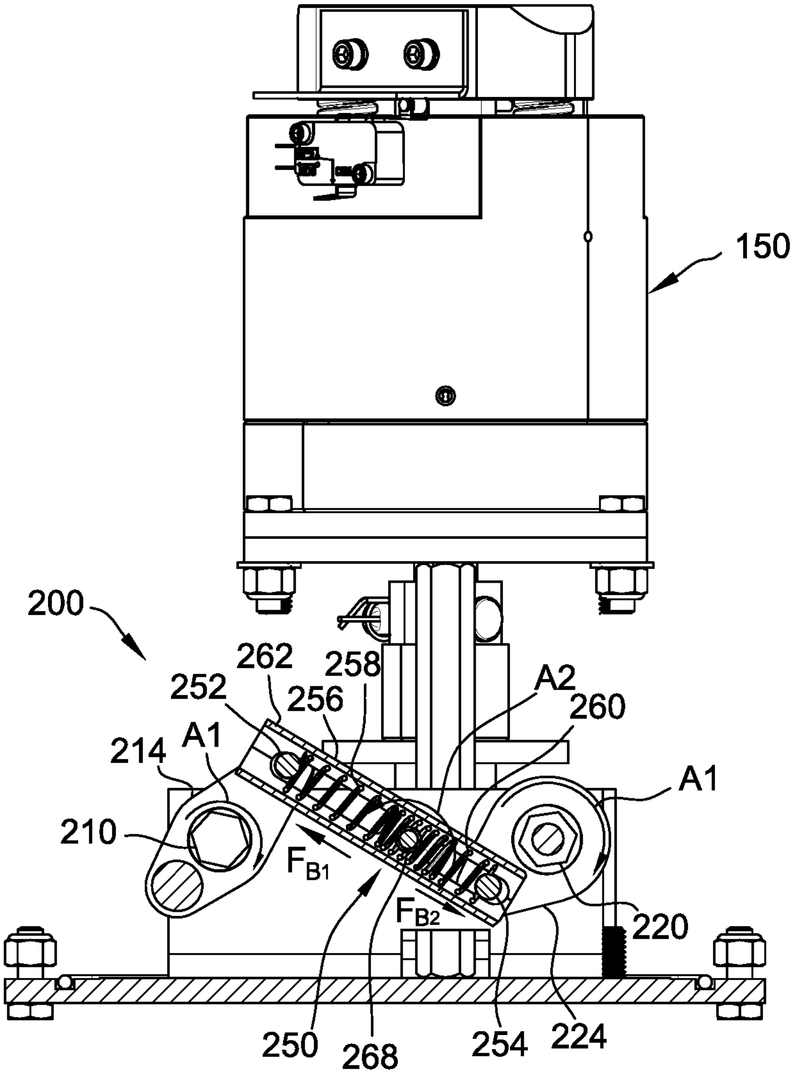
FIG. 5B is a cross-sectional side view of the mechanical assembly of FIG. 5A.

FIG. 5A illustrates a side view of the biasing assembly 250 of the mechanical assembly 200 and FIG. 5B illustrates a cross-sectional view of the biasing assembly 250 of FIG. 5A. As shown, the biasing assembly 250 comprises a movable first member 252 connected to the first link 214 of the first shaft 210 and a movable second member 254 connected to the second link 224 of the second shaft 220. The biasing assembly 250 further comprises a biasing member 256 disposed between the movable first member 252 and the movable second member 254 configured to bias against the movable first member 252 and the movable second member 254. In some embodiments, the biasing assembly 250 further comprises a hollow elongate body 262 which houses the movable first member 252, the movable second member 254 and the biasing member 256.

As best shown in the cross-sectional view of FIG. 5B, in some embodiments, the movable first member 252 is a movable first pin and the movable second member 254 is a movable second pin. In some embodiments, the movable first member 252 is translatable within a first longitudinal slot 264 extending longitudinally through the hollow elongate body 262 and the movable second member 254 is translatable within a second longitudinal slot 266 extending longitudinally through the hollow elongate body 262. In some embodiments, the biasing assembly 250 is pivotable about a fixed pin 268 defining a biasing assembly axis X3. In some embodiments, the biasing member 256 is a leaf spring. In some embodiments, the biasing member 256 is a coil spring.

In some embodiments, the biasing member 256 is a unitary member which extends from the movable first member 252 to the movable second member 254. In some embodiments, the biasing member 256 is comprised of two or more discrete spring members. For purposes of describing the exemplary embodiment, the biasing member 256 is comprised of a first biasing element 258 and a second biasing element 260. The first biasing element 258 is disposed between the movable first member 252 and the fixed pin 268 and the second biasing element 260 is disposed between the movable second member 254 and the fixed pin 268.

As best shown in FIGS. 3, 5A and 5B, the first shaft 210 and first link 214 are rotatable about the first axis X1 in a first angular direction A1 upon application of torque in the first angular direction A1 to the input crank 202. In response to the rotation of first shaft 210, the second shaft 220, the second link 224, and the contact arm 228 are rotatable about the second axis X2 in the first angular direction A1, and the biasing assembly 250 is rotatable about the biasing assembly axis X3 in a second angular direction A2. In some embodiments, the fixed pin 268 is positioned coaxially with the biasing assembly axis X3.

Figure 6A:
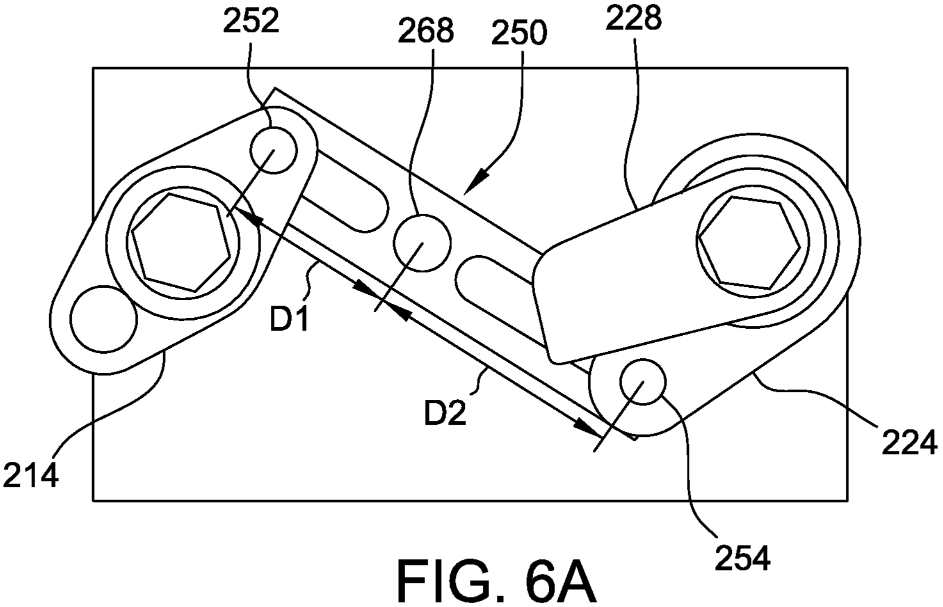
FIG. 6A is a side view of a biasing assembly of the mechanical assembly of FIG. 2 in an initial position.
Figure 6B:
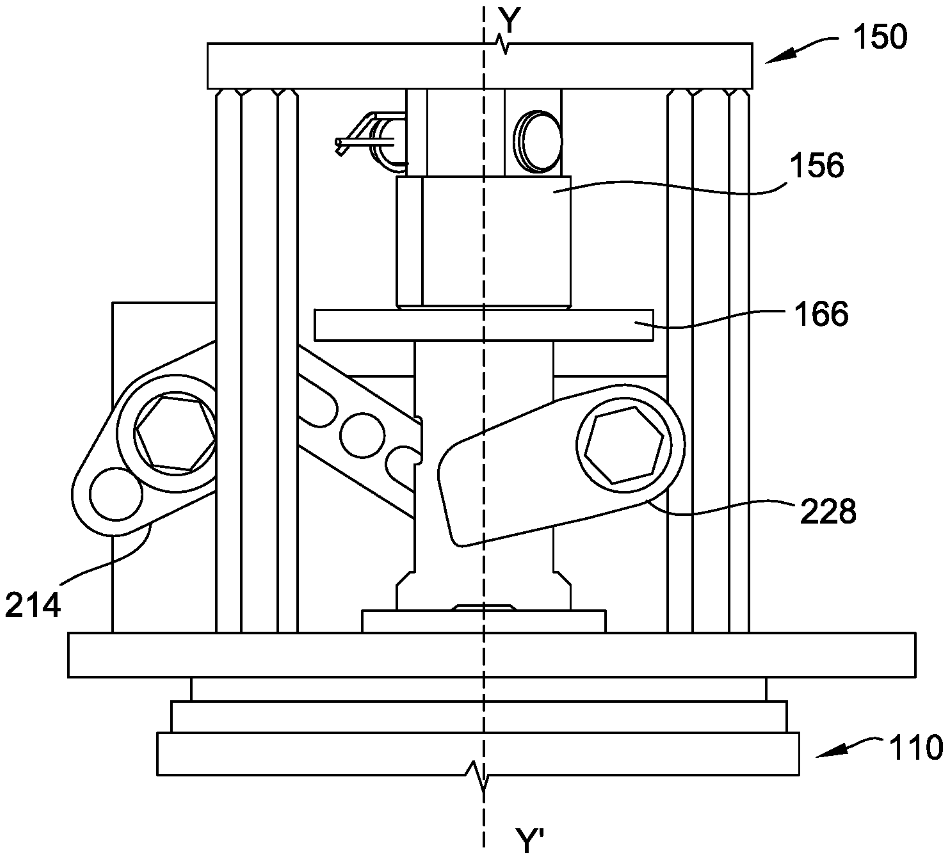
FIG. 6B is a side view of a biasing assembly of the mechanical assembly of FIG. 2 in an initial position.
Figure 8A:
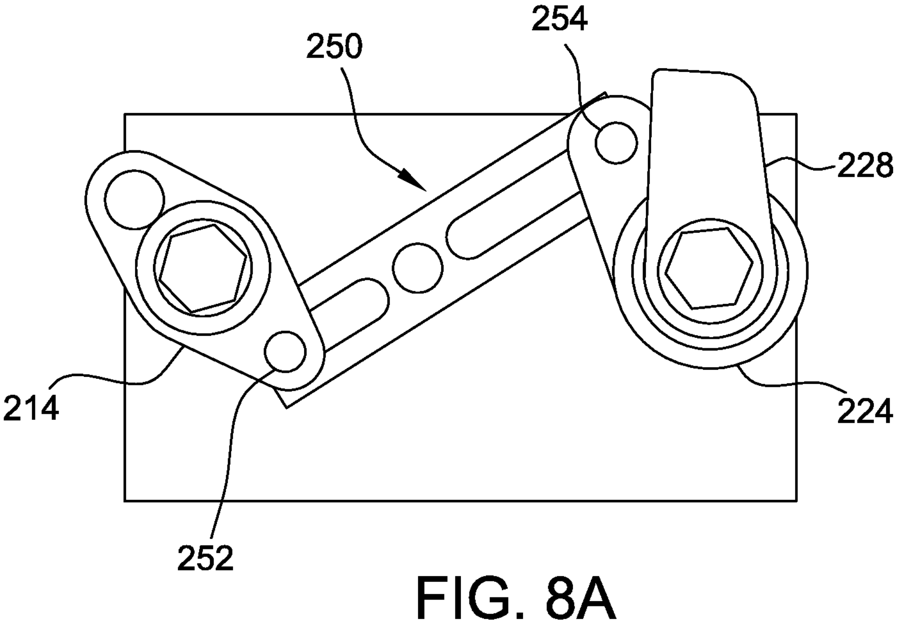
FIG. 8A is a side view of a biasing assembly of the mechanical assembly of FIG. 2 in a final position.
Figure 8B:
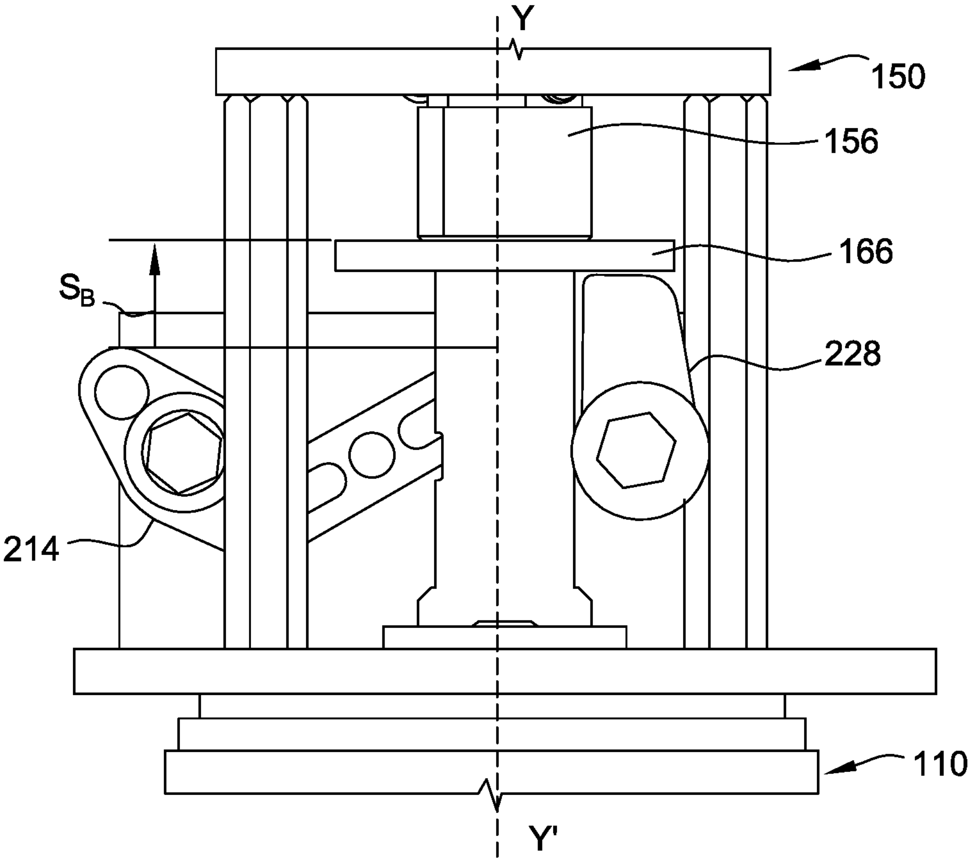
FIG. 8B is a side view of a biasing assembly of the mechanical assembly of FIG. 2 in a final position.
Figure 9A:
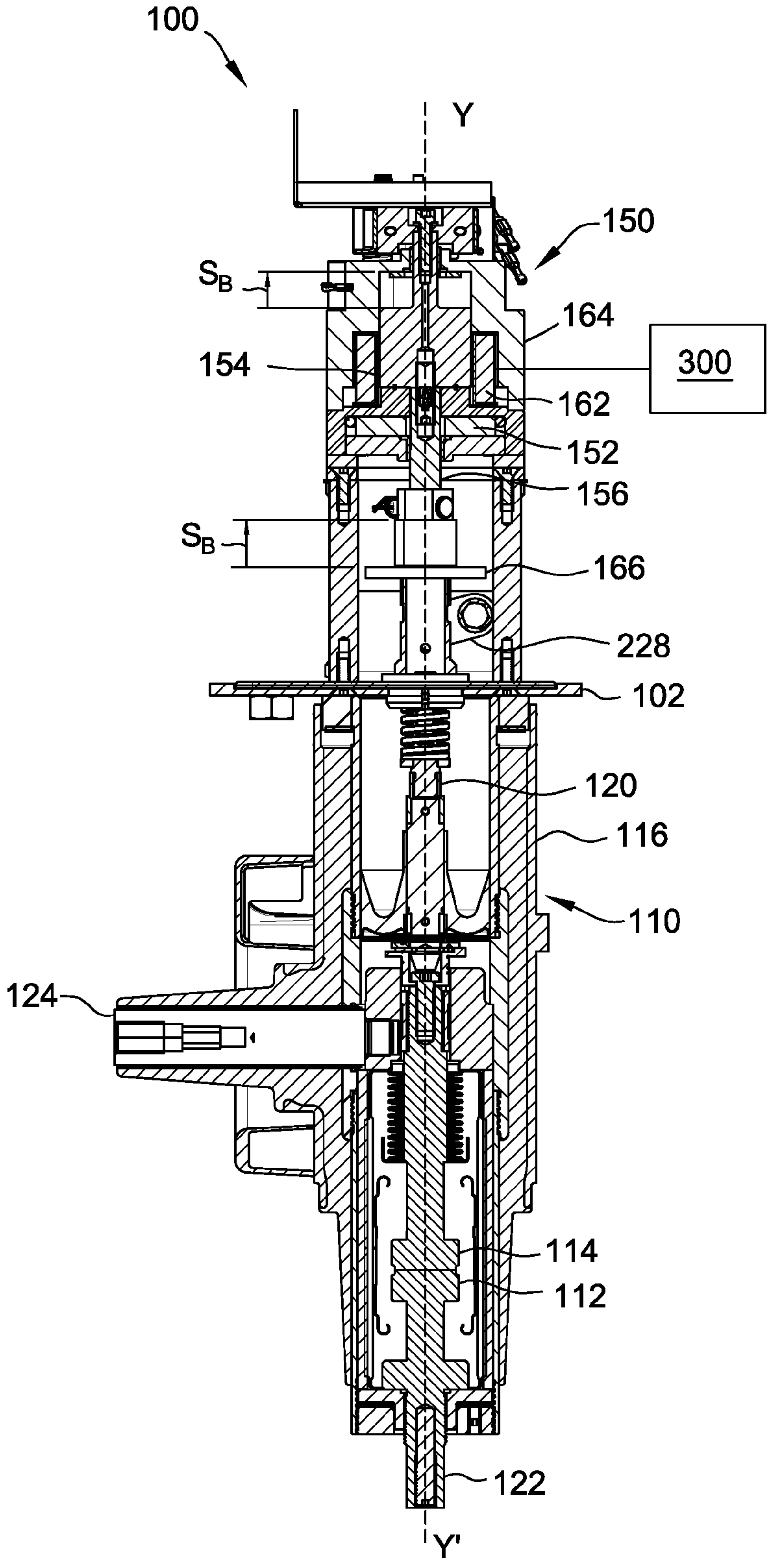
FIG. 9A is a cross-sectional side view of a molded vacuum interrupter and an electromagnetic actuator having a mechanical assembly for engaging the electromagnetic actuator in an initial position according to an embodiment of the disclosure; and, FIG. 9B is a cross-sectional side view of a molded vacuum interrupter and an electromagnetic actuator having an assembly for engaging the electromagnetic actuator in a final position according to an embodiment of the disclosure.
Figure 9B:
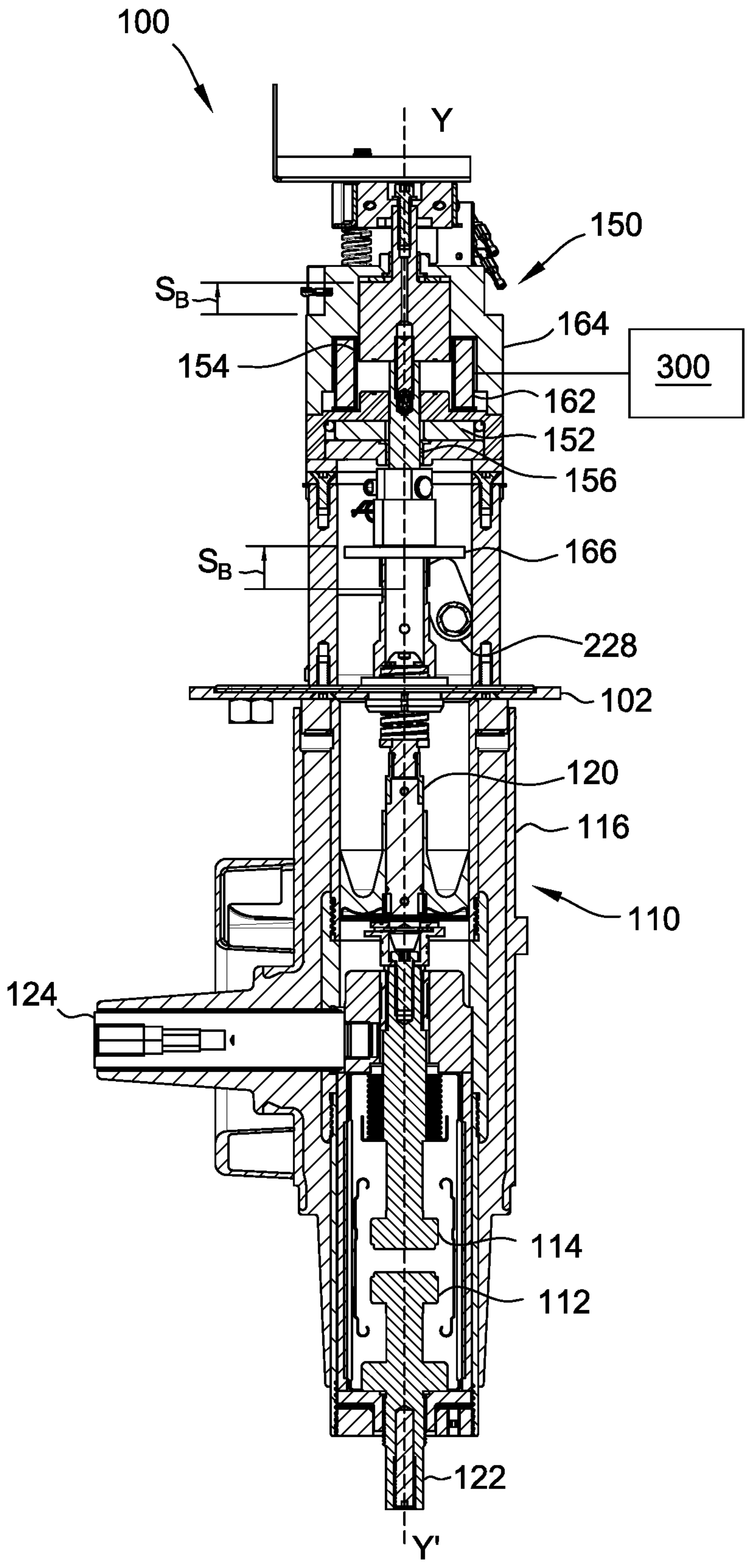

The biasing assembly 250 is rotatable between an initial position (as shown in FIGS. 6A, 6B and 9A) and a final position (as shown in FIGS. 8A, 8B and 9B). Application of torque to the input crank 202 in the first angular direction A1 causes the entire mechanical assembly 200 to rotate from the initial position until the assembly reaches a final position. The mechanical assembly 200 can be returned to the initial position only by application of torque to the input crank 202 in an angular direction opposite first angular direction A1.

Figure 7A:
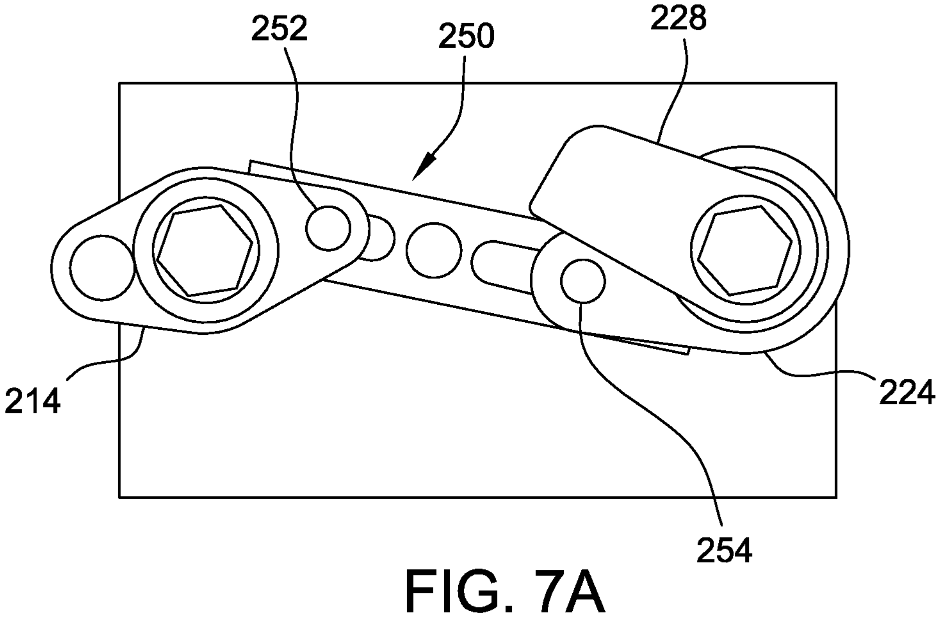
FIG. 7A is a side view of a biasing assembly of the mechanical assembly of FIG. 2 in a toggle-over position.
Figure 7B:
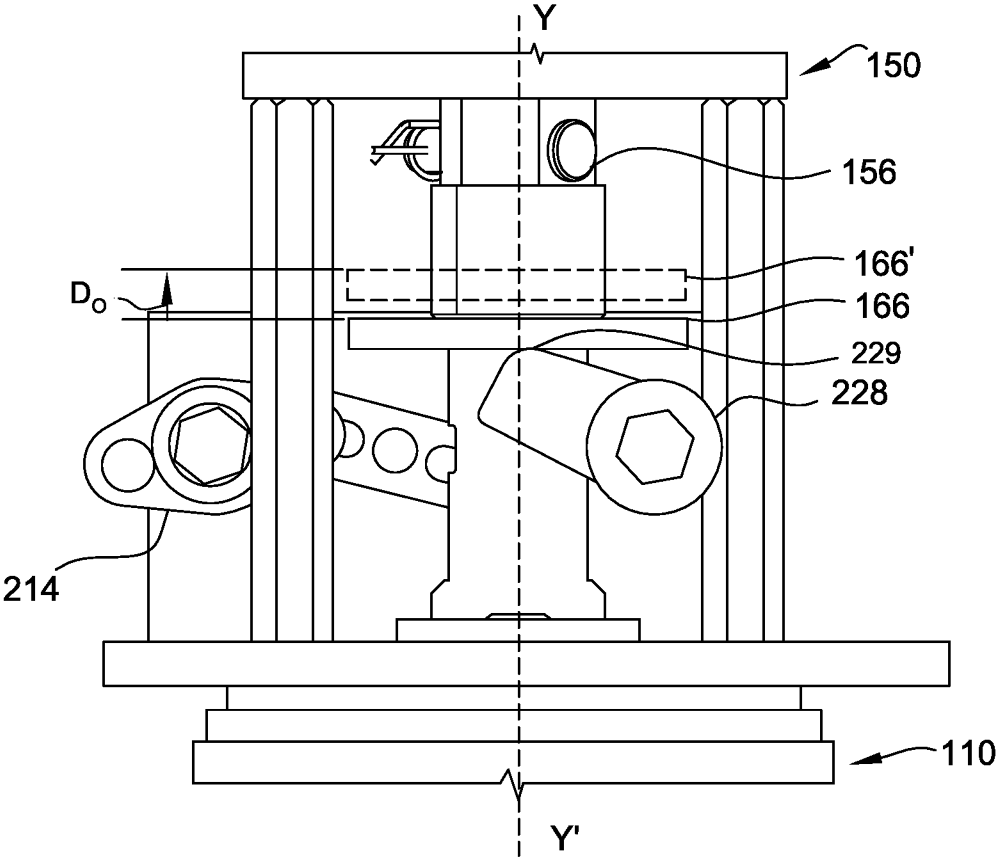
FIG. 7B is a side view of a biasing assembly of the mechanical assembly of FIG. 2 in a toggle-over position.

The biasing assembly 250 is also rotatable to an intermediate contact position and subsequently to an intermediate toggle-over position (as shown in FIGS. 7A and 7B illustrating a flange (166, 166') between the contact position and toggle-over position). The contact position and toggle-over position are positions between the initial position and final position however, the contact position and toggle-over position are not permanently maintained by the mechanical assembly 200. As used herein, the term “maintain” or “maintained” describes a component or element of the present disclosure which remains stationary upon the non-application of torque to the input crank 202. Stated differently, if torque, or more generally, angular rotation is not applied to the input crank 202, the biasing assembly 250 will urge the mechanical assembly 200 into either the initial position or the final position.

Upon rotation of the input crank 202 of FIG. 3, the first shaft 210 and first link 214 are rotated in the first angular direction A1 causing the biasing assembly 250 to rotate in the second angular direction A2 between an initial position and a final position. Rotation of the biasing assembly 250 causes the second link 224, second shaft 220 and contact arm 228 to rotate in the first angular direction A1 between the first position and final position. As explained below with reference to FIGS. 6-8, the contact arm 228 is configured to advance the sliding armature 156 and the flange 166 of the electromagnetic actuator 150 between an initial position to a final position such that the electromagnetic actuator 150 is placed in the deactivated state. In particular, rotation of the mechanical assembly 200 to the final position causes the contact arm 228 to advance the sliding armature 156 into the electromagnetic actuator 150 such that the plunger 154 is separated or pulled away from the fixed permanent magnet 152. In the final position, the contact arm 228 and more generally the mechanical assembly 200 is removably locked in the final position (shown in FIGS. 8A and 8B) such that the electromagnetic actuator 150 cannot be placed in the activated state, effectively locking out the molded vacuum interrupter 100. Rotation of the mechanical assembly 200 back to the initial position (shown in FIGS. 6A and 6B) no longer prevents the electromagnetic actuator 150 from returning to the activated state. In some embodiments, the electromagnetic actuator 150 can be returned to the activated state by energizing the electromagnetic coil 162 through the control system 300.

FIG. 6A illustrates a side view of the biasing assembly 250 in the initial position, and FIG. 6B illustrates a side view of the contact arm 228 relative to the sliding armature 156 and flange 166 of the electromagnetic actuator 150 when the biasing assembly 250 is in the initial position. As shown, the biasing assembly 250 is in the initial position, and the contact arm 228 does not contact the sliding armature 156 and flange 166. In the initial position, the electromagnetic actuator is in the activated state defined by the by the plunger 154 contacting the fixed permanent magnet 152 as shown in FIGS. 1 and 9A. In the initial position, the first biasing element 258 of biasing member 256 exerts a biasing force $F_{B1}$ against the movable first member 252 and the second biasing element 260 of the biasing member 256 exerts a biasing force $F_{B2}$ against the movable second member 254. In some embodiments, the biasing assembly 250 is configured to maintain the biasing forces $F_{B1}$ and $F_{B2}$ against the first link 214 and second link 224 such that the biasing assembly 250 remains in the initial position.

FIG. 7A illustrates a side view of the biasing assembly 250 in the contact position, and FIG. 7B illustrates a side view of the contact arm 228 relative to the sliding armature 156 and flange 166 of the electromagnetic actuator 150 in the contact position. As shown in FIG. 7B, upon movement to the contact position the contact arm 228 is rotated in the first angular direction A1 and contact arm 228 contacts and abuts against the sliding armature 156 and flange 166, but the contact arm 228 does not advance the sliding armature 156 and flange 166 and thus does not alter the activated state of the electromagnetic actuator 150. In some embodiments, the contact arm 228 has a distal sloped surface 229 which first contacts the flange 166. The sloped surface is configured to ease the advancement of the contact arm 228 against the flange 166.

Upon further movement from the contact position to the toggle-over position as shown in FIG. 7B, the contact arm 228 is rotated in the first angular direction A1 and contact arm 228 advances the sliding armature 156 and flange 166 by the trip distance, causing the flange 166' to advance and release the stored potential energy of the overtravel spring 121 and the actuator opening spring. The overtravel spring 121 and the actuator opening spring then advances the sliding armature 156 and flange 166 to place the electromagnetic actuator 150 in the deactivated state. Stated differently, upon movement by the trip distance, the electromagnetic actuator 150 is placed in the deactivated state independent of further movement of the contact arm 228 beyond the contact position. As the biasing assembly 250 is rotated to from the initial position to the toggle-over position, potential spring energy is increasingly stored within the biasing member 256, exerting the biasing forces $F_{B1}$ and $F_{B2}$ against the first link 214 and the second link 224 respectively, urging the first link 214 and the second link 224 back to the initial position. The torque applied to the input crank 202 must be sufficient to overcome the biasing forces $F_{B1}$ and $F_{B2}$ causing the biasing assembly 250 to rotate to the toggle-over position. Stated differently, if the torque is removed from the input crank 202 before the biasing assembly 250 has rotated beyond the toggle-over position, the biasing assembly 250 will return to the initial position. Rotation of the biasing assembly 250 beyond the toggle-over position to the final position will cause the release of the potential spring energy, exerting the biasing forces $F_{B1}$ and $F_{B2}$ against the first link 214 and the second link 224 respectively, urging the first link 214 and the second link 224 to the final position. Thus, before the biasing assembly 250 is rotated to the toggle-over position, the biasing assembly 250 will return the initial position so long as torque is no longer applied to the input crank 202 of FIG. 3. Likewise, after the biasing assembly 250 is rotated beyond the toggle-over position, the biasing assembly 250 will rotate to the final position so long as torque is no longer applied to the input crank 202 of FIG. 3.

FIG. 8A illustrates a side view of the biasing assembly 250 in the final position, and FIG. 8B illustrates a side view of the contact arm 228 relative to the sliding armature 156 and flange 166 of the electromagnetic actuator 150 in the final position. The contact arm 228, and the mechanical assembly 200 generally, are maintained in the final position such that the contact arm 228 prevents the sliding armature 156 from contacting the fixed permanent magnet 152, returning the electromagnetic actuator to the activated state. Thus, in the final position, the mechanical assembly 200 effectively locks-out the electromagnetic actuator 150.

Referring now to FIG. 9A, the vacuum circuit breaker 110 is closed and the electromagnetic actuator 150 is in the activated state. The mechanical assembly 200 is in the initial position and the contact arm 228 does not abut or contact the sliding armature 156 or the flange 166, allowing free movement of the sliding armature 156 and free activation and deactivation of the electromagnetic actuator 150. The molded vacuum interrupter 100 can open or close by activating or deactivating the electromagnetic actuator 150.

Referring now to FIG. 9B, the mechanical assembly 200 is in the final position such that the contact arm 228 has fully advanced the sliding armature 156 to place the electromagnetic actuator 150 in the deactivated state, opening the vacuum circuit breaker circuit. Rotation of the biasing assembly 250 and the contact arm 228 from the initial position to the contact position and further by the trip distance advances the sliding armature 156 of the electromagnetic actuator 150, separating the plunger 154 from the permanent magnet 152 to deactivate the electromagnetic actuator 150. The first end 158 of the sliding armature 156 is coupled to the overtravel spring 121 such that the movable conductive contact 114 is also separated from the fixed conductive contact 112 by the stroke distance $S_B$. Thus, rotation of the mechanical assembly 200 from the initial position to the final position through the intermediate contact position and toggle-over position deactivates the electromagnetic actuator 150 and opens the vacuum circuit breaker 110 circuit.

In operation, torque is applied in the first angular direction A1 to the input crank 202 causing the first link 214 to rotate by an input angular distance such that the first link 214 is rotated in the first angular direction A1 from the initial position to the final position. Through the biasing assembly 250 connecting the first link 214 and the second link 224, the contact arm 228 is rotated by a contact arm angular distance from the initial position to the final position. The input angular distance and contact arm angular distance is defined in degrees, and the contact arm angular distance is configured to fully advance the sliding armature 156 by the stroke distance $S_B$. The input angular distance and the contact arm angular distance are rotating in the first angular direction A1 when the mechanical assembly 200 is rotated between the initial position and final position to lock-out the molded vacuum interrupter 100. Likewise, to unlock the molded vacuum interrupter 100 and permit the electromagnetic actuator 150 to return to the activated state, the input crank 202 is turned in an opposite direction to the first angular distance A1 until the contact arm 228 is returned from the final position to the initial position.

Thus, even if a control signal is sent to the energizing the electromagnetic coil 162, the electromagnetic actuator will not return to the activated state due to the contact arm 228 blocking advancement of the sliding armature 156 and flange 166. Servicepersons performing maintenance of switchgear or substations using the molded vacuum interrupter 100 can mechanically lock-out the molded vacuum interrupter 100 by rotating the mechanical assembly 200 to the final position, providing a mechanical lock-out for the molded vacuum interrupter 100 by preventing accidental activation of the electromagnetic actuator 150. Even if the control system 300 were to inadvertently send a signal to electrically energize the electromagnetic coil 162 due to static discharge or human error, the contact arm 228 will prevent the sliding armature 156 or the flange 166 from advancing the movable conductive contact 114 by the stroke distance $S_B$.

In some embodiments, the input angular distance is equal to the contact arm angular distance. In some embodiments, the input angular distance is less than the contact arm angular distance. In some embodiments, the input angular distance is greater than the contact arm angular distance. By way of example, but not limitation, the input angular distance can be configured to require a greater angular distance than the contact arm angular distance such that the input crank 202 is not unintentionally rotated between the initial position and final position.

In some embodiments, the input angular distance is 40 degrees between the initial position and toggle-over position. In some embodiments, the input angular distance is in the range of 40 to 50 degrees between the initial position and toggle-over position. In some embodiments, the input angular distance is 82 degrees between the initial position and final position. In some embodiments, the input angular distance is in the range of 80 to 90 degrees between the initial position and final position.

Referring back to FIG. 6A, the ratio of input angular distance to contact arm angular distance can be increased or decreased by changing the relative distance of the movable first member 252 and movable second member 254 relative to the fixed pin 268. In particular, the movable first member 252 and fixed pin 268 define a first moment arm having a distance D1, and the movable second member 254 and fixed pin 268 define a second moment arm having a distance D2. The distance D1 of the first moment arm and the distance D2 of the second arm can be configured to be equal, resulting in a 1:1 ratio of input angular distance to contact arm angular distance. Alternatively, the distance D1 of the first moment arm and the distance D2 of the second arm can be configured to result in a greater or lesser input angular distance relative to the contact arm angular distance. In some embodiments, the ratio is in the range of 1.1:1 to 1.3:1.

In some embodiments, the released potential spring energy of the biasing member 256 after the toggle-over position is sufficient to fully advance the contact arm from the toggle-over position to the final position. In some embodiments, the released potential spring energy of the biasing member 256 after the toggle-over position is sufficient to prevent the biasing assembly 250 from returning to the initial position. In some embodiments, further torque is required to fully advance the contact arm from the toggle-over position to the final position.

A method for locking-out a molded vacuum interrupter comprising the steps of rotating the input crank 202 in the first angular direction A1 such that the contact arm 228 of the mechanical assembly 200 is rotated from the initial position to the toggle-over position, further rotating the input crank 202 in the first angular direction such that the contact arm 228 of the mechanical assembly is rotated from the toggle-over position to the final position. In some embodiments, the method comprises the steps of rotating the input crank 202 in the first angular direction A1 such that the contact arm 228 of the mechanical assembly 200 is rotated from the initial position to the final position.

A method for mechanically un-locking a molded vacuum interrupter comprising the steps of rotating the input crank 202 in an opposite direction to the first angular direction A1 such that the contact arm 228 of the mechanical assembly 200 is rotated from the final position to the toggle-over position. In some embodiments, the method comprises the steps of rotating the input crank 202 in an opposite direction to the first angular direction A1 such that the contact arm 228 of the mechanical assembly 200 is rotated from the final position to the initial position.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for engaging an electromagnetic actuator comprising:

a first shaft having a first end connected to an input crank and a first link located along the first shaft, the first shaft and the first link rotatable about a first axis in a first angular direction;

a second shaft having a second link located along the second shaft, and a contact arm located along the second shaft, the second link and the contact arm rotatable about a second axis in the first angular direction, the contact arm configured to advance a sliding armature of the electromagnetic actuator; and a biasing assembly having a movable first member connected to the first link, a movable second member connected to the second link, and a biasing member disposed between the first movable member and the second movable member, the biasing assembly rotatable about a biasing assembly axis in a second angular direction between an initial position and a final position, wherein rotation of the first link in the first angular direction between the initial position and a toggle-over position causes the biasing member to rotate in the second angular direction, and the first movable member and the second movable member to compress the biasing member, and wherein rotation of the first link in the first angular direction between the toggle-over position and the final position causes the biasing member to urge the first movable member and the second movable member away from the biasing member.

2. The assembly of claim 1, the biasing assembly comprising an elongate body, wherein the movable first member translates within a first longitudinal slot of the elongate body and the movable second member translates within a second longitudinal slot of the elongate body.

3. The assembly of claim 2, wherein the biasing assembly further comprises a pivoting member disposed between the first longitudinal slot and the second longitudinal slot, the pivoting member positioned coaxially with the biasing assembly axis, the biasing assembly rotatable about the pivoting member.

4. The assembly of claim 3, wherein the biasing assembly further comprises a first biasing element disposed between the pivoting member and the movable first member, and a second biasing element disposed between the pivoting member and the movable second member.

5. The assembly of claim 4, wherein the first biasing element is configured to bias against the movable first member and the second biasing element is configured to bias against the movable second member.

6. The assembly of claim 1, wherein the biasing assembly applies a biasing force against the first link and the second link such that rotation of the first link between the initial position and the toggle-over position causes the first link to return to the initial position.

7. The assembly of claim 6, wherein the biasing force is released upon rotation of the first link beyond the toggle-over position.

8. The assembly of claim 6, wherein the biasing force is released upon rotation of the first link beyond the toggle-over position such that the biasing assembly maintains the contact arm removably locked in the final position.

9. The assembly of claim 6, wherein rotation of the first link between the initial position and a contact position causes the contact arm to abut the sliding armature of the electromagnetic actuator, the contact position being between the initial position and the toggle-over position.

10. The assembly of claim 9, wherein the contact arm has a sloped surface configured to contact and advance a flange of the sliding armature of the electromagnetic actuator upon rotation of the first link between the contact position and the toggle-over position.

11. The assembly of claim 9, wherein rotation of the first link between the contact position and the toggle-over position causes the contact arm to advance the sliding armature of the electromagnetic actuator from an activated state to a deactivated state.

12. The assembly of claim 11, wherein the contact arm in the final position prevents the sliding armature of the electromagnetic actuator from returning to the activated state.

13. The assembly of claim 1, wherein the contact arm is removably locked in the final position.

14. The assembly of claim 1, wherein the first link is returned to the initial position by rotating the first shaft in an angular direction opposite the first angular direction.

15. The assembly of claim 1, wherein the input crank is selected from a group consisting of a motor and a manually operated handle.

16. A lock-out mechanism for a interrupter comprising:

at least one vacuum circuit breaker assembly comprising a fixed conductive contact and a movable conductive contact, the movable conductive contact connected to a push rod having an over-travel spring, the over-travel spring configured to separate the fixed conductive contact from the movable conductive contact upon movement of the push rod away from the fixed conductive contact;

at least one electromagnetic actuator assembly comprising a fixed permanent magnet, a plunger and a sliding armature having a first end and a second end, the first end connected to the over-travel spring of the at least one vacuum circuit breaker assembly and the second end connected to the plunger, the at least one electromagnetic actuator assembly having an activated state and a deactivated state, wherein the activated state is defined by the plunger contacting the fixed permanent magnet and the deactivated state defined by the plunger separated from the fixed permanent magnet, the at least one electromagnetic actuator assembly configured to conductively separate the movable conductive contact from the fixed conductive contact; and an assembly comprising:

a first shaft having a first end connected to an input crank and a first link located along the first shaft, the first shaft and the first link rotatable about a first axis in a first angular direction;

a second shaft having a second link located along the second shaft, and a contact arm located along the second shaft, the second link and the contact arm rotatable about a second axis in the first angular direction, the contact arm configured to advance the sliding armature of the at least one electromagnetic actuator assembly; and a biasing assembly having a movable first member connected to the first link, a movable second member connected to the second link, and a biasing member disposed between the first movable member and the second movable member, the biasing assembly rotatable about a biasing assembly axis in a second angular direction between an initial position and a final position, wherein rotation of the first link in the first angular direction between the initial position and a toggle-over position causes the biasing member to rotate in the second angular direction, and the first movable member and the second movable member to compress the biasing member, and wherein rotation of the first link in the first angular direction between the toggle-over position and the final position causes the biasing member to urge the first movable member and the second movable member away from the biasing member.

17. The lock-out mechanism of claim 16, wherein the biasing assembly applies a biasing force against the first link and the second link such that rotation of the first link between the initial position and the toggle-over position causes the first link to return to the initial position, and wherein the biasing force is released upon rotation of the first link beyond the toggle-over position such that the biasing assembly maintains the contact arm removably locked in the final position.

18. The lock-out mechanism of claim 16, wherein rotation of the first link between a contact position and the toggle-over position causes the contact arm to advance the sliding armature of the at least one electromagnetic actuator assembly from the activated state to the deactivated state, the contact position being between the initial position and the toggle-over position.

19. The lock-out mechanism of claim 16, wherein advancement of the sliding armature of the at least one electromagnetic actuator assembly from the activated state to the deactivated state releases potential energy stored in the over-travel spring and an actuator opening spring to separate the fixed conductive contact from the movable conductive contact.

20. The lock-out mechanism of claim 16, wherein the contact arm in the final position prevents the sliding armature of the at least one electromagnetic actuator assembly from returning to the activated state and prevents the fixed conductive contact from contacting the movable conductive contact of the at least one vacuum circuit breaker assembly.

21. A method for locking-out an interrupter, the method comprising:

rotating an input crank of a mechanical assembly in a first angular direction such that a contact arm of the mechanical assembly is rotated from an initial position to a contact position;

rotating the input crank in the first angular direction such that the contact arm of the mechanical assembly is rotated from the contact position to a toggle-over position; and rotating the input crank in the first angular direction such that the contact arm of the mechanical assembly is rotated from the toggle-over position to a final position, wherein the mechanical assembly comprises:

a first shaft having a first end connected to the input crank and a first link located along the first shaft, the first shaft and the first link rotatable about a first axis in the first angular direction;

a second shaft having a second link located along the second shaft, and the contact arm located along the second shaft, the second link and the contact arm rotatable about a second axis in the first angular direction, the contact arm configured to advance a sliding armature of at least one electromagnetic actuator assembly; and a biasing assembly having a movable first member connected to the first link, a movable second member connected to the second link, and a biasing member disposed between the first movable member and the second movable member, the biasing assembly rotatable about a biasing assembly axis in a second angular direction between an initial position and a final position, wherein the at least one electromagnetic actuator assembly comprises a fixed permanent magnet, a plunger and a sliding armature having a first end and a second end, the first end connected to an over-travel spring of at least one vacuum circuit breaker assembly and the second end connected to the plunger, the at least one electromagnetic actuator assembly having an activated state and a deactivated state, and wherein the activated state is defined by the plunger contacting the fixed permanent magnet and the deactivated state defined by the plunger separated from the fixed permanent magnet, the at least one electromagnetic actuator assembly configured to conductively separate a movable conductive contact from a fixed conductive contact.

22. The method of claim 21, wherein the contact arm in the final position prevents a vacuum circuit breaker from closing and prevents the sliding armature of the at least one electromagnetic actuator assembly from returning to the activated state.

23. The method of claim 21, wherein the biasing assembly applies a biasing force against the first link and the second link such that rotation of the first link between the initial position and the toggle-over position causes the first link to return to the initial position, and wherein the biasing force is released upon rotation of the first link beyond the toggle-over position such that the biasing assembly maintains the contact arm removably locked in the final position.

24. The method of claim 21, wherein rotating the input crank in an angular direction opposite the first angular direction from the final position to the initial position allows for the sliding armature of the at least one electromagnetic actuator assembly to the activated state.

25. The method of claim 21 further comprising:

rotating the input crank in an angular direction opposite the first angular direction from the final position to the initial position.

26. The method of claim 25 further comprising:

returning the at least one electromagnetic actuator assembly to the activated state.

* * * * *